United States Patent
Sekino et al.

(10) Patent No.: US 10,384,572 B2
(45) Date of Patent: Aug. 20, 2019

(54) TRIM COVER AND VEHICLE SEAT

(71) Applicant: TACHI-S CO., LTD., Tokyo (JP)

(72) Inventors: Hiroshi Sekino, Tokyo (JP); Yukihito Kobayashi, Tokyo (JP); Norio Endou, Tokyo (JP); Takahiro Kikuchi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/471,904

(22) Filed: Mar. 28, 2017

(65) Prior Publication Data
US 2017/0282766 A1    Oct. 5, 2017

(30) Foreign Application Priority Data
Mar. 29, 2016    (JP) .................................. 2016-066857

(51) Int. Cl.
*B60N 2/42*    (2006.01)
*B60N 2/58*    (2006.01)
*D05B 1/22*    (2006.01)

(52) U.S. Cl.
CPC .............. *B60N 2/58* (2013.01); *B60N 2/5891* (2013.01); *D05B 1/22* (2013.01)

(58) Field of Classification Search
CPC .......... B60R 21/207; B60R 2021/2076; B60N 2/5883; B60N 2/58; B60N 2/6009; A41D 2300/50; B32B 7/08
See application file for complete search history.

(56) References Cited

U.S. PATENT DOCUMENTS

| | | | | |
|---|---|---|---|---|
| 6,206,467 B1 * | 3/2001 | Mense | ...................... | B60N 2/58 297/218.2 |
| 6,588,838 B1 * | 7/2003 | Dick, Jr. | .............. | B60N 2/5825 297/216.13 |
| 7,690,723 B2 * | 4/2010 | Evans | ...................... | B60N 2/58 280/728.3 |
| 8,176,863 B2 * | 5/2012 | Evans | ...................... | B60N 2/58 112/475.08 |

(Continued)

FOREIGN PATENT DOCUMENTS

| | | |
|---|---|---|
| CN | 1454834 A | 11/2003 |
| CN | 201436219 U | 4/2010 |

(Continued)

OTHER PUBLICATIONS

Chinese Office Action, dated Nov. 2, 2018, for Chinese Application No. 201710196896.9, 13 pages (with machine generated English translation).

(Continued)

*Primary Examiner* — Shin H Kim
(74) *Attorney, Agent, or Firm* — Seed IP Law Group LLP

(57) ABSTRACT

A trim cover includes: a plurality of skin materials; and a sewing part formed by sewing two skin materials of the plurality of skin materials with multiple rows of seams which extend in parallel with a sewing line of the two skin materials. In the trim cover formed by sewing the plurality of skin materials, the inclining direction of the seam allowances of the two sewn skin materials can be easily made constant so as to suppress the meandering of the sewing line of the two skin materials, and the appearance quality of the vehicle seat covered with the trim cover can be improved.

5 Claims, 4 Drawing Sheets

(56) References Cited

U.S. PATENT DOCUMENTS

| | | | |
|---|---|---|---|
| 8,820,780 B2* | 9/2014 | Thomas | B60R 21/207 |
| | | | 280/728.2 |
| 9,039,092 B1* | 5/2015 | Krankkala | B60R 21/207 |
| | | | 297/452.1 |
| 2003/0207068 A1 | 11/2003 | Fujita et al. | |
| 2006/0185568 A1* | 8/2006 | Kuttner | B60R 21/2342 |
| | | | 112/475.02 |
| 2009/0001783 A1 | 1/2009 | Hazlewood et al. | |
| 2009/0129866 A1* | 5/2009 | Smallwood | E02B 3/127 |
| | | | 405/16 |
| 2012/0187731 A1* | 7/2012 | Guadagno | B60N 2/5833 |
| | | | 297/218.2 |
| 2012/0313391 A1* | 12/2012 | Kornylo | B60N 2/5883 |
| | | | 296/1.08 |
| 2014/0312664 A1* | 10/2014 | Tanabe | B60R 21/207 |
| | | | 297/216.13 |
| 2015/0291070 A1* | 10/2015 | Kitajima | B60N 2/58 |
| | | | 297/452.21 |
| 2015/0375654 A1* | 12/2015 | Lemarchand | D05B 15/00 |
| | | | 297/452.1 |
| 2016/0375807 A1* | 12/2016 | Kageyama | B60N 2/5883 |
| | | | 297/452.61 |
| 2017/0096089 A1* | 4/2017 | Egawa | B60N 2/5883 |
| 2017/0282766 A1* | 10/2017 | Sekino | B60N 2/58 |
| 2018/0022255 A1* | 1/2018 | Abe | B60N 2/5883 |

FOREIGN PATENT DOCUMENTS

| | | |
|---|---|---|
| JP | 4-16955 U | 2/1992 |
| JP | 2000-287780 A | 10/2000 |
| JP | 2012-090677 A | 5/2012 |
| KR | 10-2010-0001633 A | 1/2010 |

OTHER PUBLICATIONS

Notice of Reasons for Refusal for JP Patent Application No. 2016-066857 dated Jun. 4, 2019, with Machine English Translation.

* cited by examiner

TRIM COVER AND VEHICLE SEAT

CROSS-REFERENCE TO RELATED APPLICATION(S)

This application is based upon and claims the benefit of priority from Japanese Patent Application No. 2016-066857, filed on Mar. 29, 2016, the entire contents of which are incorporated herein by reference.

BACKGROUND

1. Field of the Invention

The present invention relates to a trim cover and a vehicle seat.

2. Description of the Related Art

Typically, a vehicle seat includes a cushion pad and a trim cover which covers the cushion pad. The trim cover is produced by sewing a plurality of skin materials. In the trim cover formed by sewing a plurality of skin materials, seam allowances of two sewn skin materials may be inclined in different directions for each portions.

If the inclining direction of seam allowances of the two sewn skin materials is not constant, a sewing line of the two skin materials meanders, and there is a risk that the appearance quality of a seat covered with the trim cover is degraded.

In order to make the inclining direction of each seam allowance of two sewn skin materials constant, the seam allowances of the two skin materials may be sewn on one skin material by attaching out-stitches.

In the trim cover described in JP-A-2000-287780, in order to make the inclining direction of the seam allowances of two sewn skin materials constant, the edge of one skin material is folded such that the seam allowance of the corresponding skin material is doubled, and the integral rigidity of the seam allowances of the two skin materials is improved.

In the trim cover described in JP-A-2012-90677, a restriction cloth is sewn on the seam allowances of two sewn skin materials, and the restriction cloth is laid over another side of one skin material of the two sewn skin materials. The seam allowances of the two sewn skin materials are stretched by the restriction cloth to be inclined in a constant direction.

In a case where the seam allowances of the two skin materials are sewn on one the skin material by attaching out-stitches, an additional process to incline the seam allowance and attach out-stitches is necessary. For this reason, it is concerned that the cost of manufacturing the trim cover is increased.

In the trim cover described in JP-A-2000-287780, since the seam allowance of one skin material is doubled, there is a risk that the thickness of a sewing part is increased, and the sewing part is swelled up so that the appearance quality of the seat covered with the trim cover is degraded.

In the trim cover described in JP-A-2012-90677, the restriction cloth is required so that the number of components increases, and an additional process to sew the restriction cloth on the seam allowance is necessary. For this reason, it is concerned that the cost of manufacturing the trim cover is increased.

SUMMARY

The invention has been made in consideration of the above circumstance, and an object thereof is to provide a trim cover formed by sewing a plurality of skin materials in which the inclining direction of seam allowances of two sewn skin materials is easily made constant, and the appearance quality of a vehicle seat covered with the trim cover is improved.

According to an aspect of the invention, there is provided a trim cover including: a plurality of skin materials; and a sewing part formed by sewing two skin materials of the plurality of skin materials with multiple rows of seams which extend in parallel with a sewing line of the two skin materials.

According to another aspect of the invention, there is provided a vehicle seat comprising: the trim cover according to the above; and a cushion pad covered with the trim cover.

According to the invention, in the trim cover formed by sewing the plurality of skin materials, the inclining direction of the seam allowances of the two sewn skin materials can be easily made constant so as to suppress the meandering of the sewing line of the two skin materials, and the appearance quality of the vehicle seat covered with the trim cover can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
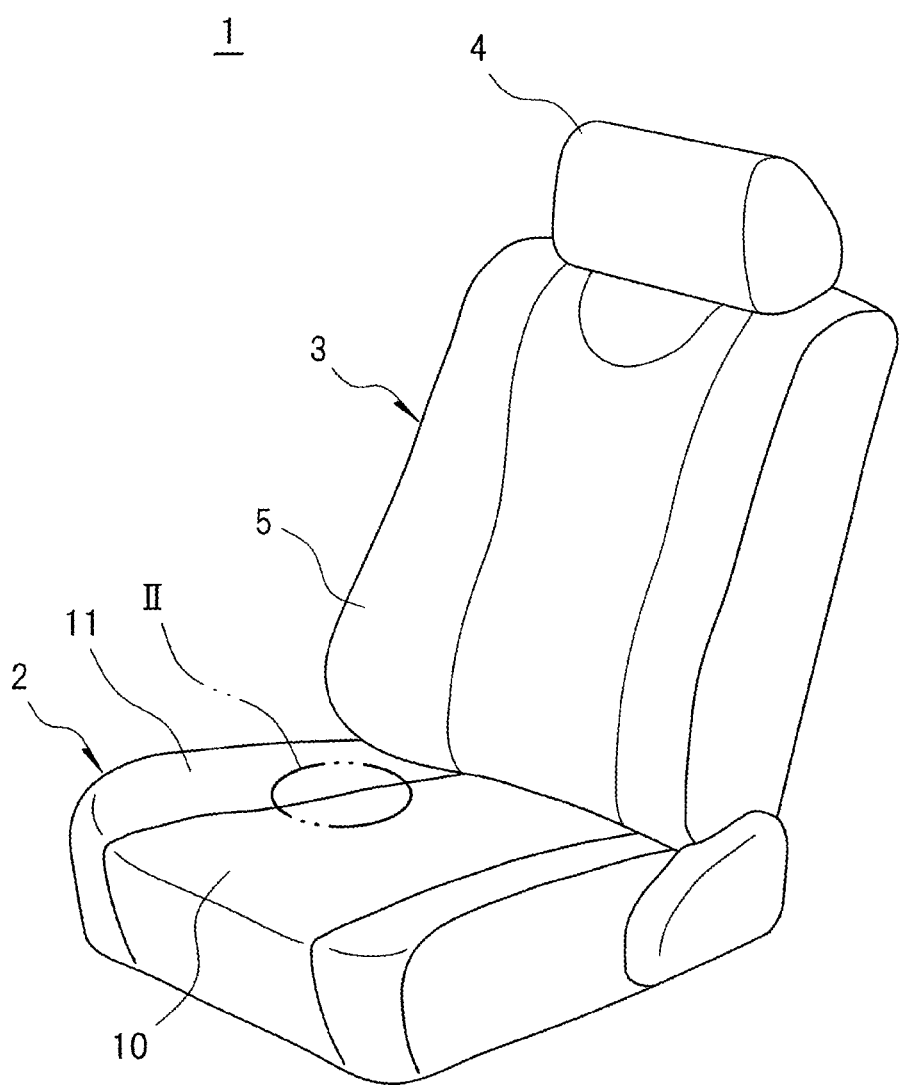
FIG. 1 is a perspective view illustrating one example of a vehicle seat for describing an embodiment of the invention.

FIG. 1 illustrates an example of a vehicle seat for describing an embodiment of the invention.

A vehicle seat 1 illustrated in FIG. 1 includes a seat cushion 2 forming a seat surface portion, a seat back 3 forming a back rest portion, and a headrest 4 which supports a head of an occupant seating on the seat. The seat cushion 2, the seat back 3, and the headrest 4 each have a cushion pad formed of a foaming material such as urethane foam and a frame which supports the cushion pad.

The cushion pad of the seat cushion 2 and the cushion pad of the seat back 3 are integrally covered with a trim cover 5, and the cushion pad of the headrest 4 is covered with another trim cover separate from the trim cover 5.

The cushion pad of the seat cushion 2 and the cushion pad of the seat back 3 may be individually covered with the separated trim covers. For example, in a case where the headrest 4 is a fixed headrest and is integrated with the seat back 3, the cushion pad of the headrest 4 may be covered with one trim cover integrally with the cushion pad of the seat back 3, or integrally with the cushion pad of the seat cushion 2 and the cushion pad of the seat back 3.

The trim cover 5 is formed by sewing a plurality of skin materials. For example, leather (natural leather and synthetic leather) or fabric (textile fabric, knitted fabric, and nonwoven cloth) is used as a skin material. The skin material may have a monolayer structure of leather or fabric, or may have a multilayer structure in which leather or fabric is used as surface fabric, and wadding (for example, resin foam such as flexible polyurethane foam which is elastically deformable) is stacked on the leather or the fabric. The trim cover 5 may be formed of one kind of skin material, or may be formed of a plurality of kinds of skin materials different depending on a portion.

Among a plurality of skin materials forming the trim cover 5, a skin material 10 is a skin material which covers the center support portion of the seat cushion 2, a skin material 11 is a skin material which covers the side support portion on one side of the seat cushion 2, and the skin material 10 and the skin material 11 are sewn with each other.

Hereinafter, a sewing part (a portion surrounded by the two-dot chain line circumference II in FIG. 1) 12 formed by sewing the skin material 10 and the skin material 11 will be described with reference to FIGS. 2 and 3.

The skin material 10 and the skin material 11 are sewn by two rows of a seam 13 and a seam 14 which extend in parallel with a linear sewing line. The skin material 10 and the skin material 11 may be sewn by multiple (three or more) rows of seams. The "seam allowances" of the skin material 10 and the skin material 11 sewn by multiple rows of seams indicate a portion from the seam (in an example illustrated in FIGS. 2 and 3, the seam 13), which is disposed to be the farthest from the edge of the skin material, to the edge of the skin material.

In a state where the trim cover 5 covers the seat cushion 2 and the seat back 3, an seam allowance 10a of the skin material 10 and an seam allowance 11a of the skin material 11 are inserted into a groove 15 provided in a cushion pad 6 of the seat cushion 2.

The skin material 10 and the skin material 11 are sewn by the seam 13, and are sewn by the seam 14 nearer to edges of the skin material 10 and the skin material 11 than the seam 13 so as to suppress an opening of the seam allowance 10a and the seam allowance 11a.

The skin material 10 and the skin material 11 are sewn by the seam 13 and the seam 14. Thus, the integral rigidity of the seam allowance 10a and the seam allowance 11a is improved compared to a case in which the skin material 10 and the skin material 11 are sewn by a single row of seam.

The opening of the seam allowance 10a and the seam allowance 11a is suppressed, and the integral rigidity of the seam allowance 10a and the seam allowance 11a is improved. Thus, for example, it is suppressed that the seam allowance 10a and the seam allowance 11a are inclined to the opposite side from each other with the sewing line partially interposed therebetween, and it is suppressed that the seam allowance 10a and the seam allowance 11a are partially inclined to the skin material 10 side or the skin material 11 side. Therefore, the inclining direction of the seam allowance 10a and the seam allowance 11a is constant overall.

Figure 2:
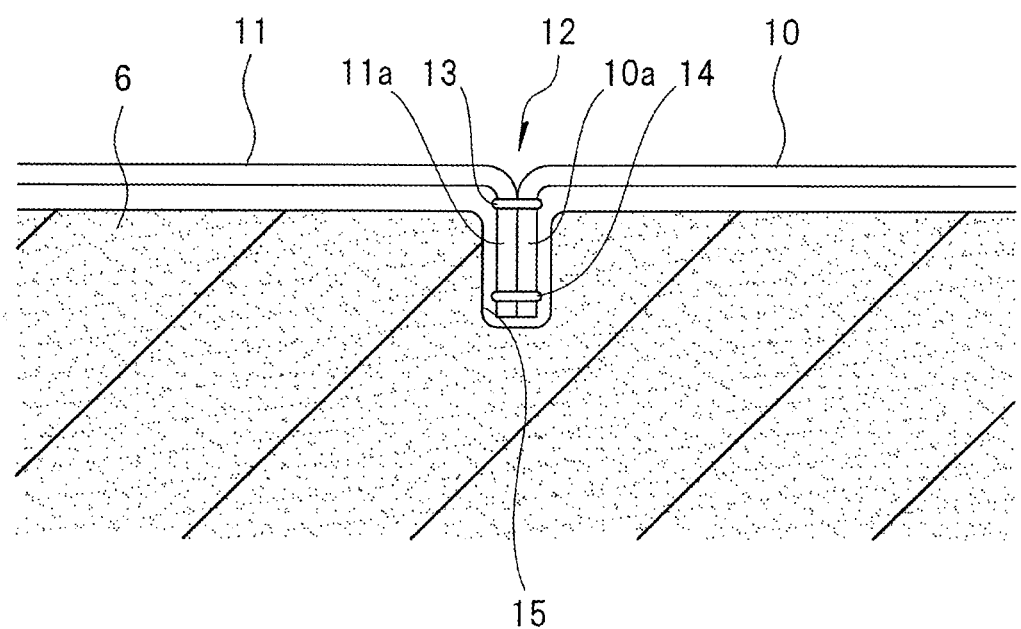
FIG. 2 is a sectional view illustrating a portion surrounded by the two-dot chain line circumference II of FIG. 1 and is one example of a sewing part of a trim cover.
Figure 3:
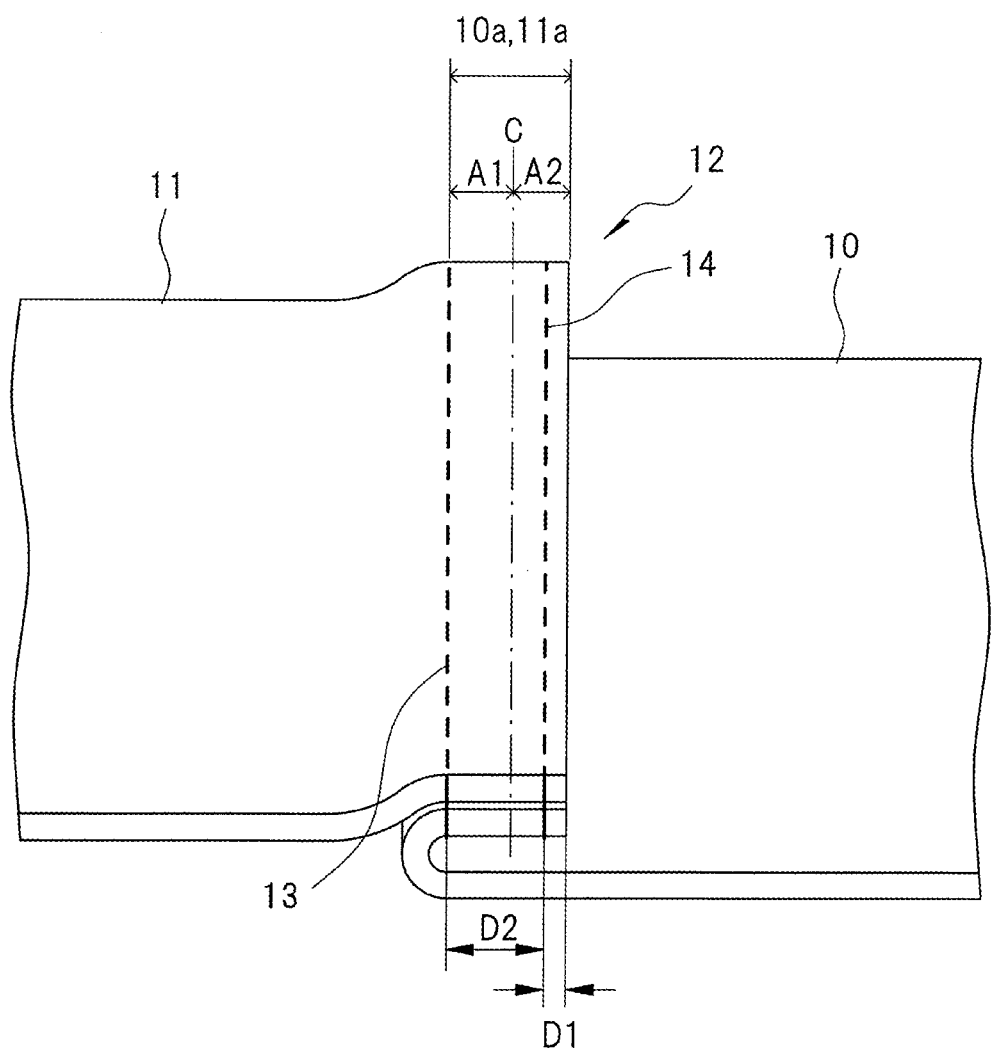
FIG. 3 is a schematic view illustrating the sewing part of FIG. 2.
Figure 4:
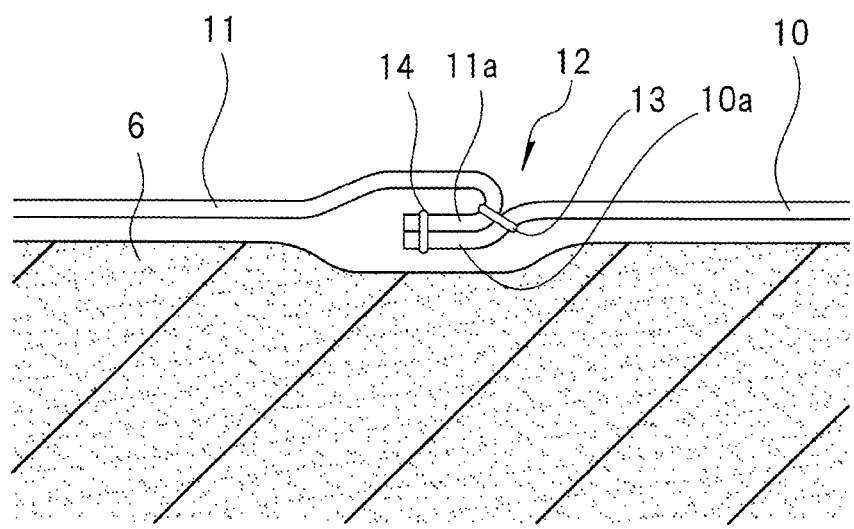
FIG. 4 is a sectional view illustrating a modification of the sewing part of FIG. 2.

In the example illustrated in FIGS. 2 and 3, the seam allowance 10a and the seam allowance 11a are inserted into the groove 15 provided in the cushion pad 6, and the seam allowance 10a and the seam allowance 11a stand overall from the skin material 10 and the skin material 11. However, as in an example illustrated in FIG. 4, the seam allowance 10a and the seam allowance 11a may be pressed to abut on the cushion pad 6, and be inclined. Even in a case where the seam allowance 10a and the seam allowance 11a are pressed to abut on the cushion pad 6 so as to be inclined, the inclining direction of the seam allowance 10a and the seam allowance 11a is constant overall. Thus, the seam allowance 10a and the seam allowance 11a are inclined overall to any one side of the skin material 10 and the skin material 11.

As above, the skin material 10 and the skin material 11 are sewn by the multiple rows of the seam 13 and the seam 14 which extend in parallel with the sewing line of a sewing part 12. Therefore, an additional process to incline the seam allowance 10a and the seam allowance 11a and attach out-stitches becomes unnecessary. A restriction cloth for stretching the seam allowance 10a and the seam allowance 11a is not required, and an additional process to sew the restriction cloth to the seam allowance 10a and the seam allowance 11a becomes unnecessary. Thus, it is possible to easily make the inclining direction of the seam allowance 10a and the seam allowance 11a constant. In addition, the skin material 10 and the skin material 11 are sewn by the multiple rows of the seam 13 and the seam 14 so that the inclining direction of the seam allowance 10a and the seam allowance 11a becomes constant. Thus, it can be avoided that the thickness of the sewing part increases in a case where the seam allowance of one skin material is doubled, and the sewing part becomes bulge due to the increase of the thickness. Therefore, it is possible to suppress the meandering of the sewing line of the sewing part 12, and it is possible to improve the appearance quality of the vehicle seat 1 covered with the trim cover 5.

From the viewpoint of suppressing the opening of the seam allowance 10a and the seam allowance 11a, and improving the integral rigidity of the seam allowance 10a and the seam allowance 11a, as illustrated in FIG. 3, in a case where the seam allowance 10a and the seam allowance 11a are divided into a first area A1 and a second area A2 while a center line C, which extends along the sewing line of the sewing part 12 in the center of the seam allowance 10a and the seam allowance 11a in the width direction, is set as a boundary, the multiple rows of seams for sewing the skin material 10 and the skin material 11 are preferably provided in one or more rows in each of the first area A1 and the second area A2. In the example illustrated in FIG. 3, the seam 13 is provided in the first area A1, and the seam 14 is provided in the second area A2.

One or more rows of seams are provided in each of the first area A1 and the second area A2, and thus two rows of the seams (in the example illustrated in FIG. 3, the seam 13 and the seam 14) on both ends in a parallel direction among the multiple rows of seams which extend in parallel are disposed in a suitably separated state. Therefore, the opening of the seam allowance 10a and the seam allowance 11a is reliably suppressed, and the integral rigidity of the seam allowance 10a and the seam allowance 11a can be further improved.

A distance D1 between the seam, which is disposed the closest to the edges of the skin material 10 and the skin material 11 among the multiple rows of seams for sewing the skin material 10 and the skin material 11, and the edge of the skin material 10 and the skin material 11 is preferably 4 mm or less. When the distance D1 is 4 mm or less, the opening of the seam allowance 10a and the seam allowance 11a can be more reliably suppressed.

A distance D2 between the two rows of adjacent seams among the multiple rows of seams for sewing the skin material 10 and the skin material 11 is preferably from 2 mm to 8 mm. When the distance D2 is excessively small, the case is not largely different from the case where the skin material 10 and the skin material 11 are sewn by a single row of seam.

When the distance D2 is excessively large, a force of restricting the seam allowance 10a and the seam allowance 11a is weakened between the two rows of adjacent seams. In any case of them, an effect that improves the integral rigidity of the seam allowance 10a and the seam allowance 11a is reduced. When the distance D2 is set from 2 mm to 8 mm, the integral rigidity of the seam allowance 10a and the seam allowance 11a can be effectively improved.

Figure 5:
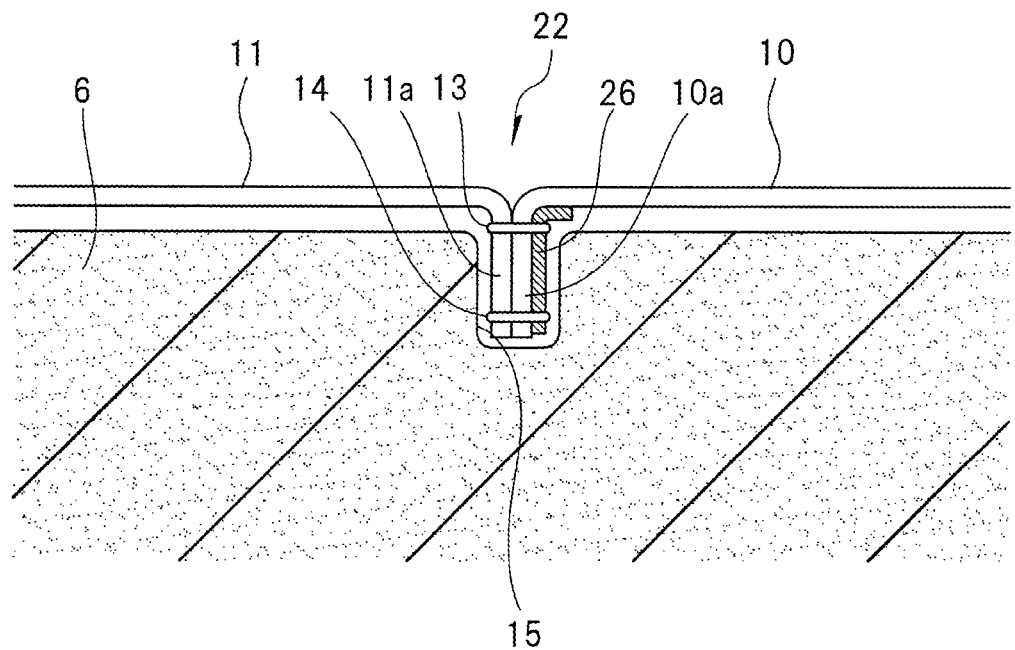
FIG. 5 is a sectional view illustrating another modification of the sewing part of FIG. 2.

FIG. 5 illustrates a modification of the sewing part 12.

A sewing part 22 illustrated in FIG. 5 includes a reinforcement material 26 sewn by the seam 13 and the seam 14 integrally with the skin material 10 and the skin material 11. The reinforcement material 26 is overlapped with the seam allowance 10a and the seam allowance 11a. The reinforcement material 26 can make the integral rigidity of the seam allowance 10a and the seam allowance 11a improved, and can make the inclining direction of the seam allowance 10a and the seam allowance 11a constant more reliably.

For example, the reinforcement material 26 may be made of the same material as the skin material 10 and the skin material 11. However, from the viewpoint of suppressing the increase of the thickness of the sewing part 22, the reinforcement material 26 is preferably made of a material thinner than the skin material 10 and the skin material 11.

Heretofore, the description of the invention has been given about an example in which the sewing part 12 is formed by sewing the skin material 10 covering the center support portion of the seat cushion 2 and the skin material 11 covering the side support portion on one side of the seat cushion 2 along a linear sewing line. However, the invention can be applied to another sewing part formed by sewing the two skin materials along a linear or curved sewing line.

What is claimed is:

1. A trim cover comprising:
   a plurality of skin materials;
   a sewing part formed by sewing two skin materials of the plurality of skin materials with multiple rows of seams which extend in parallel with a sewing line of the two skin materials, the multiple rows of seams sewing together only the two skin materials,
   wherein seam allowances of the two skin materials in the sewing part are divided into a first area and a second area while a center line, which extends along the sewing line in the center of the seam allowances in the width direction, is set as a boundary, the multiple rows of seams are provided in one or more rows in each of the first area and the second area, and
   the seam allowances of the two skin materials are pressed to abut a cushion pad and inclined overall to one side of the two skin materials.

2. The trim cover according to claim 1, wherein distance between a seam, which is disposed the closest to an edge of the two skin materials in the sewing part among the multiple rows of seams of the sewing part, and the edge is 4 mm or less.

3. The trim cover according to claim 1, wherein a distance between two rows of adjacent seams of the sewing part is from 2 mm to 8 mm.

4. A vehicle seat comprising:
   a trim cover including: a plurality of skin materials; and a sewing part formed by sewing two skin materials of the plurality of skin materials with multiple rows of seams which extend in parallel with a sewing line of the two skin materials, the multiple rows of seams sewing together only the two skin materials; and
   a cushion pad covered with the trim cover,
   wherein seam allowances of the two skin materials in the sewing part are divided into a first area and a second area while a center line, which extends along the sewing line in the center of the seam allowances in the width direction, is set as a boundary, the multiple rows of seams are provided in one or more rows in each of the first area and the second area, and
   the seam allowances of the two skin materials are pressed to abut a cushion pad and inclined overall to one side of the two skin materials.

5. The trim cover according to claim 1, wherein the multiple rows of seams are located in seam allowances of the two skin materials in the sewing part and the seam allowances are inclined relative to the plurality of skin materials.

* * * * *